(12) United States Patent
Yoon et al.

(10) Patent No.: US 9,935,900 B2
(45) Date of Patent: Apr. 3, 2018

(54) METHOD FOR PROVIDING PROTECTION SWITCHING SERVICE IN VIRTUAL TENANT NETWORK AND CONTROLLER THEREFOR

(71) Applicant: ELECTRONICS AND TELECOMMUNICATIONS RESEARCH INSTITUTE, Daejeon-si (KR)

(72) Inventors: Bin Yeong Yoon, Daejeon-si (KR); Tae Il Kim, Daejeon-si (KR); Soo Myung Park, Daejeon-si (KR); Jong Hyun Lee, Daejeon-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 94 days.

(21) Appl. No.: 14/837,212

(22) Filed: Aug. 27, 2015

(65) Prior Publication Data
US 2016/0112349 A1   Apr. 21, 2016

(30) Foreign Application Priority Data

Oct. 16, 2014  (KR) .................. 10-2014-0140121
May 6, 2015   (KR) .................. 10-2015-0063322

(51) Int. Cl.
*H04L 12/939* (2013.01)
*H04L 12/931* (2013.01)

(52) U.S. Cl.
CPC .......... *H04L 49/552* (2013.01); *H04L 49/354* (2013.01); *H04L 49/70* (2013.01)

(58) Field of Classification Search
CPC ..... H04L 41/0654; H04L 45/00; H04L 45/16; H04L 45/22; H04L 45/28; H04L 45/507;
(Continued)

(56) References Cited

U.S. PATENT DOCUMENTS 5,982,517 A * 11/1999 Fishman .............. H04B 10/032
                                                          370/222
6,917,759 B2 * 7/2005 de Boer ................. H04J 3/085
                                                            398/5
(Continued)

FOREIGN PATENT DOCUMENTS

CN    102136898 A  *  7/2011 ......... H04L 41/0668
CN    103782552 A     5/2014
(Continued)

OTHER PUBLICATIONS

James Kempf, et al; "Scalable Fault Management for OpenFlow", Published in: Communications (ICC), 2012 IEEE International Conference on; Jun. 10-15, 2012; pp. 6606-6610.
(Continued)

*Primary Examiner* — Eric Nowlin
(74) *Attorney, Agent, or Firm* — Ladas & Parry LLP

(57) ABSTRACT

A method for providing a protection switching service in a virtual tenant network (VTN) and a controller are provided. The method enables a real-time protection switching setup on a VTN path in order to provide reliability of a VTN service.

19 Claims, 10 Drawing Sheets

(58) Field of Classification Search
CPC . H04L 49/3009; H04L 49/354; H04L 49/552; H04L 49/70; H04L 12/437; H04L 41/0659; H04L 41/0663; H04L 41/12; H04L 45/02; H04L 45/70; H04L 47/728; H04L 2012/5627; H04B 10/03; H04B 10/032; H04B 10/038; H04B 10/0793

See application file for complete search history.

(56) References Cited

U.S. PATENT DOCUMENTS

| | | | | |
|---|---|---|---|---|
| 6,934,248 B1* | 8/2005 | DeBoer | H04J 3/085 | 370/217 |
| 6,981,174 B1* | 12/2005 | Hanning | G06F 11/2007 | 714/4.11 |
| 6,992,978 B1* | 1/2006 | Humblet | H04L 12/66 | 370/227 |
| 7,197,008 B1* | 3/2007 | Shabtay | H04L 12/4633 | 370/218 |
| 7,206,508 B2* | 4/2007 | Sharma | H04J 14/0283 | 398/30 |
| 7,298,693 B1* | 11/2007 | Owens | H04J 3/14 | 370/216 |
| 7,313,330 B2* | 12/2007 | Kim | H04Q 11/0067 | 398/19 |
| 7,460,783 B2* | 12/2008 | Fumagalli | H04J 14/0227 | 370/216 |
| 7,590,048 B2* | 9/2009 | Doukai | H04L 45/00 | 370/217 |
| 7,725,558 B2* | 5/2010 | Dickenson | G06F 21/78 | 709/215 |
| 7,756,019 B2* | 7/2010 | Zhai | H04L 45/00 | 370/228 |
| 7,796,504 B1* | 9/2010 | Owens | H04L 29/06 | 370/225 |
| 7,872,967 B2* | 1/2011 | Chun | H04L 41/0668 | 370/228 |
| 7,881,184 B2* | 2/2011 | Owens | H04J 3/14 | 370/216 |
| 8,179,785 B1* | 5/2012 | Newman | H04L 41/0627 | 370/217 |
| 8,243,743 B2* | 8/2012 | Martin | H04L 12/4625 | 370/360 |
| 8,248,913 B1* | 8/2012 | Liu | H04L 45/22 | 370/216 |
| 8,248,917 B2* | 8/2012 | Lei | H04L 45/00 | 370/217 |
| 8,325,611 B2* | 12/2012 | Friskney | H04L 41/0681 | 370/236.2 |
| 8,406,124 B2* | 3/2013 | Long | H04L 45/02 | 370/220 |
| 8,433,190 B2* | 4/2013 | Wellbrock | H04B 10/0777 | 359/334 |
| 8,588,058 B2* | 11/2013 | Owens | H04J 3/14 | 370/216 |
| 8,659,994 B2* | 2/2014 | Singh | H04L 45/245 | 370/218 |
| 8,675,479 B2* | 3/2014 | Cirkovic | H04L 43/0811 | 370/228 |
| 8,737,203 B2* | 5/2014 | Owens | H04L 29/06 | 370/225 |
| 8,760,997 B2* | 6/2014 | Kang | H04J 14/0268 | 370/216 |
| 8,787,750 B2* | 7/2014 | Zi | H04J 3/14 | 398/1 |
| 8,792,509 B2* | 7/2014 | Martin | H04L 12/4625 | 370/218 |
| 8,832,705 B1* | 9/2014 | Berde | G06F 9/526 | 709/226 |
| 8,854,975 B2* | 10/2014 | Friskney | H04L 41/0681 | 370/236.2 |
| 8,873,378 B2* | 10/2014 | Wei | H04L 12/413 | 370/225 |
| 8,879,383 B1* | 11/2014 | Cirkovic | H04L 45/00 | 370/219 |
| 8,898,335 B2* | 11/2014 | Miyazaki | H04L 45/00 | 370/351 |
| 8,988,982 B2* | 3/2015 | Kim | H04L 43/0817 | 370/218 |
| 9,013,977 B2* | 4/2015 | Singh | H04B 10/032 | 370/217 |
| 9,025,465 B2* | 5/2015 | Cheng | H04L 12/4633 | 370/241 |
| 9,030,925 B2* | 5/2015 | Cheung | H04L 45/24 | 370/216 |
| 9,036,466 B2* | 5/2015 | Cirkovic | H04L 43/0811 | 370/228 |
| 9,065,759 B2* | 6/2015 | Cheng | H04L 45/24 | |
| 9,100,117 B2* | 8/2015 | Miyabe | H04B 10/032 | |
| 9,106,573 B2* | 8/2015 | Martin | H04L 12/4625 | |
| 9,136,903 B2* | 9/2015 | Youn | H04B 1/74 | |
| 9,136,940 B2* | 9/2015 | Youn | H04B 10/032 | |
| 9,161,106 B2* | 10/2015 | Sun | H04L 69/40 | |
| 9,191,272 B2* | 11/2015 | Cheung | H04L 49/65 | |
| 9,264,300 B2* | 2/2016 | O'Connor | H04L 41/0659 | |
| 9,288,140 B2* | 3/2016 | Shah | H04L 45/28 | |
| 9,311,196 B2* | 4/2016 | Kim | G06F 11/2002 | |
| 9,319,305 B2* | 4/2016 | Chen | H04L 45/22 | |
| 9,432,749 B2* | 8/2016 | Hironaka | H04Q 11/0005 | |
| 9,450,774 B2* | 9/2016 | Ali | H04L 12/64 | |
| 9,467,332 B2* | 10/2016 | O'Connor | H04L 41/0663 | |
| 9,515,871 B2* | 12/2016 | Kim | H04L 45/28 | |
| 9,515,919 B2* | 12/2016 | Ra | H04L 45/28 | |
| 9,580,091 B2* | 2/2017 | Kraeling | B61L 15/0027 | |
| 9,602,194 B2* | 3/2017 | Miyabe | H04B 10/032 | |
| 9,621,487 B2* | 4/2017 | Ra | H04L 49/557 | |
| 9,667,341 B2* | 5/2017 | Youn | H04B 10/032 | |
| 2003/0147352 A1* | 8/2003 | Ishibashi | H04J 14/0227 | 370/248 |
| 2003/0233474 A1* | 12/2003 | Yamamoto | H04L 45/00 | 709/239 |
| 2004/0170426 A1* | 9/2004 | Fumagalli | H04J 14/0227 | 398/5 |
| 2004/0208118 A1* | 10/2004 | DeBoer | H04J 3/085 | 370/223 |
| 2005/0031345 A1* | 2/2005 | Sharma | H04J 14/0283 | 398/45 |
| 2005/0122899 A1* | 6/2005 | DeBoer | H04J 3/085 | 370/222 |
| 2007/0159961 A1* | 7/2007 | Zhai | H04L 45/00 | 370/217 |
| 2007/0242605 A1* | 10/2007 | Lei | H04L 45/00 | 370/228 |
| 2008/0316920 A1* | 12/2008 | Chun | H04L 41/0668 | 370/225 |
| 2009/0147777 A1* | 6/2009 | Owens | H04J 3/14 | 370/389 |
| 2009/0228604 A1* | 9/2009 | Miyazaki | H04L 45/00 | 709/238 |
| 2010/0232287 A1* | 9/2010 | Long | H04L 45/02 | 370/220 |
| 2010/0260197 A1* | 10/2010 | Martin | H04L 12/4625 | 370/408 |
| 2010/0271938 A1* | 10/2010 | Mutoh | H04L 12/4604 | 370/228 |
| 2010/0296393 A1* | 11/2010 | Owens | H04L 29/06 | 370/225 |
| 2011/0038634 A1* | 2/2011 | DeCusatis | H04J 14/0287 | 398/79 |
| 2011/0085440 A1* | 4/2011 | Owens | H04J 3/14 | 370/216 |
| 2011/0096670 A1* | 4/2011 | Cheng | H04L 12/4633 | 370/241.1 |
| 2011/0116786 A1* | 5/2011 | Wellbrock | H04B 10/032 | 398/2 |
| 2011/0142438 A1* | 6/2011 | Youn | H04J 14/0295 | 398/5 |
| 2011/0286324 A1 | 11/2011 | Bellagamba et al. | | |
| 2012/0082026 A1* | 4/2012 | Ryoo | H04L 45/28 | 370/220 |

(56) References Cited

U.S. PATENT DOCUMENTS

| | | | |
|---|---|---|---|
| 2012/0093152 A1* | 4/2012 | Singh | H04L 45/245 370/390 |
| 2012/0141117 A1* | 6/2012 | Kang | H04J 14/0268 398/5 |
| 2012/0147741 A1* | 6/2012 | Wei | H04L 12/413 370/225 |
| 2012/0163163 A1* | 6/2012 | Kim | H04L 41/0663 370/218 |
| 2012/0163803 A1* | 6/2012 | Zi | H04J 3/14 398/17 |
| 2012/0250500 A1* | 10/2012 | Liu | H04L 45/22 370/228 |
| 2012/0257886 A1* | 10/2012 | Sun | H04Q 11/0062 398/5 |
| 2012/0281525 A1* | 11/2012 | Addanki | H04L 49/557 370/225 |
| 2012/0294140 A1* | 11/2012 | Cheung | H04L 45/24 370/216 |
| 2012/0315030 A1* | 12/2012 | Singh | H04B 10/032 398/1 |
| 2013/0016606 A1* | 1/2013 | Cirkovic | H04L 43/0811 370/225 |
| 2013/0028071 A1* | 1/2013 | Martin | H04L 12/4625 370/217 |
| 2013/0064073 A1* | 3/2013 | Cheng | H04L 45/22 370/225 |
| 2013/0070586 A1* | 3/2013 | Friskney | H04L 41/0681 370/228 |
| 2013/0083652 A1* | 4/2013 | Cheung | H04L 45/28 370/228 |
| 2013/0121140 A1* | 5/2013 | Ryoo | H04L 41/0668 370/228 |
| 2013/0128720 A1* | 5/2013 | Kim | H04L 43/0817 370/218 |
| 2014/0006843 A1* | 1/2014 | Kim | G06F 11/2002 714/4.1 |
| 2014/0010071 A1* | 1/2014 | Kim | H04L 12/437 370/223 |
| 2014/0010073 A1* | 1/2014 | Shah | H04L 45/28 370/228 |
| 2014/0036927 A1* | 2/2014 | Kim | H04L 12/413 370/406 |
| 2014/0050470 A1* | 2/2014 | Youn | H04B 10/032 398/1 |
| 2014/0056122 A1* | 2/2014 | Singal | H04L 41/0668 370/220 |
| 2014/0064064 A1* | 3/2014 | Kim | H04L 41/0659 370/225 |
| 2014/0071813 A1* | 3/2014 | Cheung | H04L 49/65 370/228 |
| 2014/0086581 A1* | 3/2014 | Youn | H04B 1/74 398/45 |
| 2014/0112187 A1 | 4/2014 | Kang et al. | |
| 2014/0119176 A1* | 5/2014 | Cirkovic | H04L 43/0811 370/228 |
| 2014/0121953 A1* | 5/2014 | Kraeling | G08G 1/22 701/117 |
| 2014/0161437 A1* | 6/2014 | Miyabe | H04B 10/032 398/5 |
| 2014/0198635 A1* | 7/2014 | Han | H04L 45/28 370/228 |
| 2014/0233373 A1* | 8/2014 | O'Connor | H04L 41/0663 370/228 |
| 2014/0241349 A1 | 8/2014 | Yoon et al. | |
| 2014/0286154 A1* | 9/2014 | O'Connor | H04L 41/0659 370/218 |
| 2014/0328164 A1* | 11/2014 | Kim | H04L 45/22 370/225 |
| 2014/0369185 A1* | 12/2014 | Chen | H04L 45/50 370/221 |
| 2015/0003232 A1* | 1/2015 | Friskney | H04L 41/0681 370/228 |
| 2015/0016245 A1* | 1/2015 | Ra | H04L 45/28 370/228 |
| 2015/0029837 A1* | 1/2015 | Ashwood-Smith | H04L 45/34 370/228 |
| 2015/0063097 A1* | 3/2015 | Martin | H04L 12/4625 370/225 |
| 2015/0098317 A1* | 4/2015 | Cheung | H04L 45/28 370/218 |
| 2015/0109900 A1* | 4/2015 | Kim | H04L 41/0663 370/218 |
| 2015/0210302 A1* | 7/2015 | Kraeling | B61L 15/0027 701/117 |
| 2015/0229398 A1* | 8/2015 | Lee | H04B 10/27 398/66 |
| 2015/0244454 A1* | 8/2015 | Kim | H04B 10/032 398/2 |
| 2015/0271107 A1* | 9/2015 | Ra | H04L 49/557 370/218 |
| 2015/0365318 A1* | 12/2015 | Liu | H04L 45/04 709/239 |
| 2016/0020850 A1* | 1/2016 | Youn | H04B 10/032 398/5 |
| 2016/0036521 A1* | 2/2016 | Miyabe | H04B 10/032 398/5 |
| 2016/0112303 A1* | 4/2016 | Yoo | H04L 45/24 398/45 |
| 2016/0119225 A1* | 4/2016 | Tochio | H04L 45/28 370/228 |
| 2016/0134466 A1* | 5/2016 | Ye | H04L 12/6418 370/225 |
| 2016/0142286 A1* | 5/2016 | Kim | H04L 45/22 370/218 |
| 2016/0149802 A1* | 5/2016 | Youn | H04L 45/22 398/45 |
| 2016/0156546 A1* | 6/2016 | Ceccarelli | H04J 14/0295 398/52 |
| 2016/0173225 A1* | 6/2016 | Cavaliere | H04J 14/0287 398/7 |
| 2016/0261456 A1* | 9/2016 | Yoon | H04L 69/16 |
| 2016/0337031 A1* | 11/2016 | Hironaka | H04Q 11/0005 |
| 2017/0012827 A1* | 1/2017 | Ashwood-Smith | H04L 41/12 |
| 2017/0043488 A1* | 2/2017 | Henry | B22C 9/22 |
| 2017/0104551 A1* | 4/2017 | Charlet | H04J 14/0287 |
| 2017/0111186 A1* | 4/2017 | Tochio | H04L 12/465 |
| 2017/0111213 A1* | 4/2017 | Ryoo | H04L 41/0659 |
| 2017/0117957 A1* | 4/2017 | Bottari | H04B 10/032 |

FOREIGN PATENT DOCUMENTS

| | | | | |
|---|---|---|---|---|
| CN | 105337761 A | * | 2/2016 | |
| CN | 103117924 B | * | 8/2017 | |
| EP | 2442501 A1 | * | 4/2012 | .......... H04L 45/245 |
| EP | 3022857 A1 | * | 5/2016 | .......... H04J 14/0295 |
| JP | 2012-049674 A | | 3/2012 | |
| JP | 2014-160922 A | | 9/2014 | |
| KR | 100696176 B1 | * | 3/2007 | ......... H04L 41/0668 |
| KR | 20130068204 A | | 6/2013 | |
| KR | 1020140014263 A | | 2/2014 | |
| KR | 1020140072343 A | | 6/2014 | |
| WO | WO 2007066910 A1 | * | 6/2007 | ......... H04L 41/0668 |
| WO | WO 2010036266 A1 | * | 4/2010 | .......... H04J 14/0294 |
| WO | WO 2010148770 A1 | * | 12/2010 | .......... H04L 45/22 |
| WO | WO 2011022910 A1 | * | 3/2011 | .......... H04L 12/413 |
| WO | WO 2011078563 A2 | * | 6/2011 | .......... H04L 12/437 |
| WO | WO 2012079399 A1 | * | 6/2012 | ............. H04L 41/00 |
| WO | WO 2012123954 A1 | * | 9/2012 | .......... H04L 1/0061 |
| WO | WO 2013185567 A1 | * | 12/2013 | .......... H04L 41/0813 |
| WO | WO 2014026585 A1 | * | 2/2014 | .......... H04B 10/038 |
| WO | WO 2015007346 A1 | * | 1/2015 | .......... H04J 14/0295 |
| WO | WO 2015154603 A1 | * | 10/2015 | |
| WO | WO 2017045106 A1 | * | 3/2017 | ............... H04B 1/74 |

OTHER PUBLICATIONS

Niels L. M. Van Adrichem, et al; "Fast Recovery in Software-Defined Networks", Published in: Software Defined Networks

(56) References Cited

OTHER PUBLICATIONS (EWSDN), 2014 Third European Workshop on; Sep. 1-3, 2014; pp. 61-66.

\* cited by examiner

METHOD FOR PROVIDING PROTECTION SWITCHING SERVICE IN VIRTUAL TENANT NETWORK AND CONTROLLER THEREFOR

CROSS REFERENCE TO RELATED APPLICATION

This application claims the benefit under 35 U.S.C. § 119(a) of Korean Patent Application Nos. 10-2014-0140121, filed on Oct. 16, 2014, and 10-2015-0063322, filed on May 6, 2015, the entire disclosures of which are incorporated herein by references for all purposes.

BACKGROUND

1. Field

The following description relates to a virtual network, and more specifically, a technology for protection switching in a virtual network.

2. Description of the Related Art

A virtual tenant network (hereinafter, referred to as a "VTN") refers to a virtual network in units of tenant, which allows a user to configure and run a desired network, regardless of physical infrastructure. In a software-defined network (hereinafter, referred to as an "SDN"), a multi-tenancy-based network service may be needed in order to provide a VTN service to a plurality of users. For example, if a user requests a VTN service to a controller of the SDN, the controller provides individual users with independent networks to which data is to be delivered, by mapping virtual network to a physical network at a lower level.

In a general network, network connection services, for example, a private line service and a protection switching service are provided according to a passive setting method of a network administrator. Therefore, the general network has limitations in providing various real-time network services. Recently, the development of SDN-based VTN technology to provide real-time network connection services is underway.

SUMMARY

Accordingly, in one aspect, there is provided a controller for a virtual tenant network (VTN) path and a method for providing a real-time VTN protection switching service in order to increase reliability of a VTN service.

In one general aspect, there is provided a method for providing a protection switching service, including: receiving a protection switching setup request message from a client entity that requests setup of protection switching on a path in a virtual tenant network (VTN); analyzing the protection switching setup request message to check whether or not the client entity requests to share a protection switching group with other client entities; in response to a check result indicating that the client entity does not request to share the protection switching group, setting up protection switching for a single client entity to exclusively use the protection switching group; and in response to a check result indicating that the client entity requests to share the protection switching group, setting up protection switching for a plurality of client entities to share the protection switching group.

In the receiving of the protection switching request message, path characteristic information, protection switching type information and protection switching setup selection information may also be received from the client entity, and the protection switching setup selection information may contain information indicating the following: whether to specify a protection switching group, whether to share a protection switching group, whether to exclusively use a protection switching group, and whether to use a protection path in an event of sharing a protection switching group.

The setting up of the protection switching for a single client entity to exclusively use the protection switching group may include, in response to the check result indicating that the client entity does not request to share the protection switching group, determining whether or not an existing protection switching group is available to use, setting up, in response to a determination that a new protection switching group needs to be used, the protection switching by creating the new protection switching group, and setting up, in response to a determination that the existing protection switching group is available to use intact, the protection switching by joining a working path to the existing protection switching group.

In the determining of whether the existing protection switching group is available to use, it may be determined whether the existing protection switching group is available to use based on the path characteristic information, the protection switching type information, and the protection switching setup selection information, which are received from the client entity, it may be determined to use the existing protection switching group when the client entity specifies a protection switching group or when a protection switching group capable of receiving a working path is present, and the new protection switching group may be created when there is no available protection switching group.

The setting up of the protection switching by creating the new protection switching group may include: creating the new protection switching group and registering a working path and a protection path belonging to the created protection switching group; requesting a server entity that a protection path passes through to establish a connection to the protection path; and setting up a method for performing protection switching against a working path failure.

In the setting up of the method for performing protection switching, the server entity may be set to report a failure event to the controller in a reactive protection mode, in order to enable the controller to perform protection switching.

In the setting up of the method for performing protection switching, the server entity may be set to switch from a working path to a protection path autonomously in order to perform protection switching in the occurrence of a failure in a proactive protection mode.

The setting up of the protection switching by joining the working path to the existing protection switching group may include: joining the working path to the existing protection switching group; setting the server entity to report a failure event to the controller in a reactive protection mode, in order to enable the controller to perform protection switching; and setting the server entity to switch from a working path to a protection path autonomously in order to perform protection switching in the occurrence of a failure in a proactive protection mode.

The setting up of the protection switching for the plurality of client entities to share the protection switching group may include: checking whether or not the plurality of client entities that share the protection switching group request to use a protection path; in response to a determination that the plurality of client entities do not request to use the protection path, determining whether the existing protection switching group is available to use, creating the new protection switching group and setting up a working path and a protection path in response to a determination that a new protection switching group needs to be used; and joining a working path to the existing protection group in response to a determination that the existing protection switching group is available to use; and in response to a determination that the plurality of client entities request to use the protection path, determining whether the existing protection switching group is available to use, creating the new protection switching group and setting up a working path and a protection path in response to a determination that a new protection switching group needs to be used, and joining a working path to the existing protection group in response to a determination that the existing protection switching group is available to use.

The setting up of the protection switching for the plurality of client entities to share the protection switching group may include: once the setup of the protection switching is completed, notifying the client entity of a result of setup of the protection switching; and notifying the client entity of protection switching information, as well, which includes a working path identifier, a protection path identifier, a protection switching group identifier, a type of protection switching and state information of the protection switching group.

The method may further include performing protection switching in the occurrence of a failure in a working path.

The performing of the protection switching may include: in the occurrence of a failure in a working path, receiving a failure event alarm message from the server entity in a reactive protection mode; looking up routing information of a protection path that corresponds to the working path in which the failure occurs in a path information table by using protection switching information in the received failure event alarm message; switching from the working path to the protection path using the routing information of the protection path; and notifying the client entity that the protection switching has been performed.

The performing of the protection switching may include: in a proactive protection mode, receiving a notification that the server entity performs the protection switching without intervention of the controller when a failure has occurred in a working path; and notifying the client entity that the protection switching has been performed.

The method may further include: receiving a protection path releasing message from the client entity; requesting the server client to release the protection path used by the client entity; determining whether to deleting the protection switching group; in response to a determination that the protection switching group is to be deleted, requesting the server entity through which the protection path passes to release the protection path, deleting the protection switching group containing the protection path from the path information table, and notifying the client entity of a result of releasing the protection switching; and in response to a determination that the protection switching group is maintained, deleting the protection path from the protection switching group in the path information table and notifying the client entity of a result of deleting the protection path.

The method may further include: receiving a working path releasing message from the client entity; requesting the server entity to release the working path that was used by the client entity; determining whether to deleting the protection switching group; in response to a determination that the protection switching group is to be deleted, requesting the server entity through which the protection path passes to release the protection path, deleting the protection switching group containing the protection path from the path information table, and notifying the client entity of a result of releasing the protection switching; and in response to a determination that the protection switching group is maintained, deleting the working path from the protection switching group in the path information table and notifying the client entity of a result of deleting the working path.

The requesting to release the working path may include: in a reactive protection mode, requesting the server entity to release an alarm event regarding the working path requested; and in a proactive protection mode, requesting the server entity to clear protection switching settings.

In another general aspect, there is provided a controller including: a first interface configured to be connected to a client entity which requests a protection switching service on a path in a virtual tenant network (VTN); a second interface configured to be connected to a server entity that provides a network infrastructure; a path computation element configured to compute routing paths of a working path and a protection path; a protection switching controller configured to manage a protection switching group consisting of a working path and a protection path, set up protection switching according to a request from the client entity, and perform protection switching; and a storage element configured to store path information table that provides path information for the protection switching.

The controller may be configured to provide the client entity with a protection switching service associated with a VTN in a software-defined network (SDN).

The path information table may store mapping information between a working path and a protection path of each protection switching group.

The protection switching controller may be configured to set up the protection switching to be performed on a physical network infrastructure, and thereby is allowed to use standardized protection switching protocol without modifying the protocol.

Other features and aspects will be apparent from the following detailed description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The exemplary embodiments now will be described more fully hereinafter with reference to the accompanying figures. In the following description, a detailed description of known functions and configurations incorporated herein will be omitted when it may obscure the subject matter with unnecessary detail. Terms used throughout this specification are defined in consideration of functions according to exemplary embodiments, and can be varied according to a purpose of a user or manager, or precedent and so on. Therefore, definitions of the terms should be made on the basis of the overall context.

Figure 1:
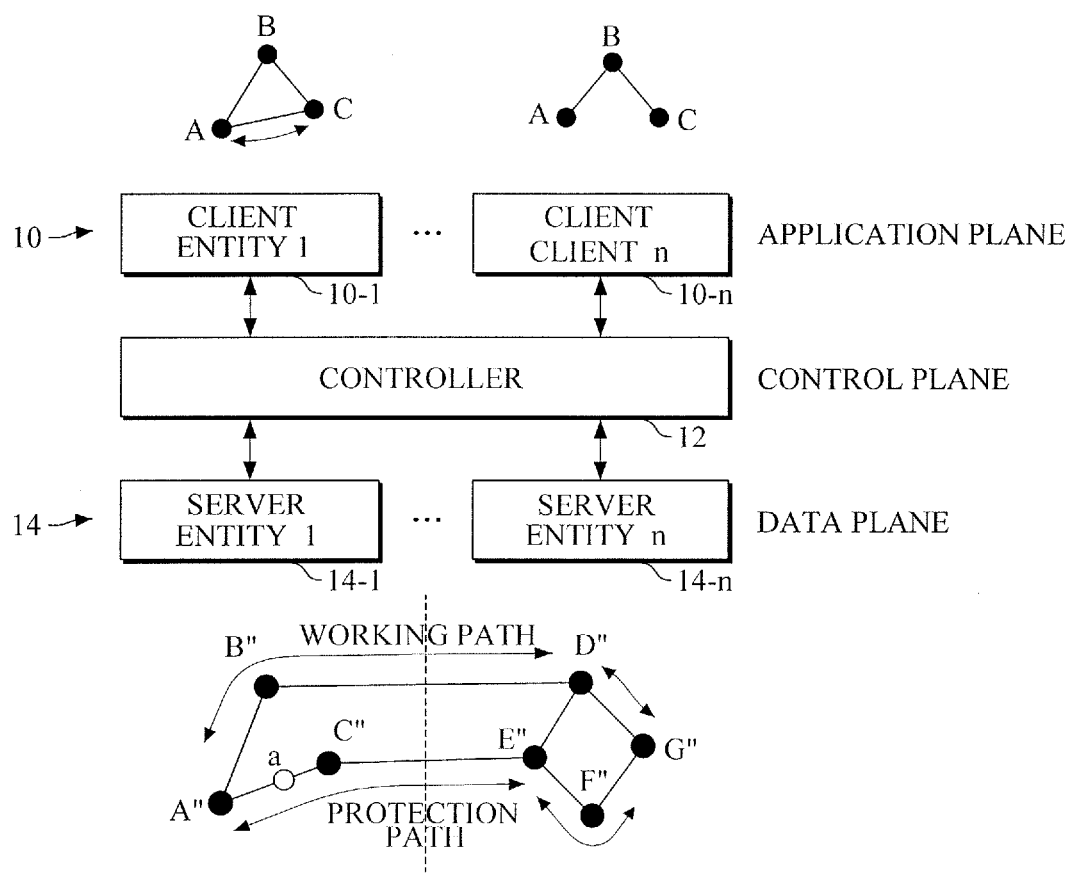
FIG. 1 is a conceptual diagram for explaining a protection switching model in a virtual tenant network (hereinafter, referred to as "VTN").

FIG. 1 is a conceptual diagram for explaining a protection switching model in a virtual tenant network (hereinafter, referred to as "VTN").

Unlike an existing general network, in a software-defined network (hereinafter, referred to as "SDN"), a VTN service is provided to provide a real-time network service to a user. The VTN service can set up, modify and release a real-time network upon request from a user.

The present disclosure discloses a technology that allows a user to set up a VTN protection switching service in real time in order to increase a reliability of a VTN service. The VTN protection switching service may be configured such that protection switching is performed on a physical network infrastructure or on a virtual network infrastructure. Through the protection switching, a path is switched from a working path (WP) to a protection path (PP) in the event of a fault or failure occurring in the working path (WP). If the protection switching is set to be performed on a physical network infrastructure, the protection switching service can be provided by using the existing standardized automatic protection switching (APS) protocol.

Referring to FIG. 1, the SDN-based VTN protection switching system includes a client entity 10, an SDN controller 12, and a server entity 14.

A plurality of client entities 10 may be provided. For example, as shown in FIG. 1, there may be n number of client entities 10-1, . . . , and 10-n. A plurality of server entities 14 may be provided. For example, as shown in FIG. 1, there may be n number of server entities 14-1, . . . , and 14-n.

The client entity 10 is a SDN controller that the user possesses, and is located on an application plane. The client entity 10 requests for the VTN service and receives it. The controller 12 is located on a control plane. The controller 12 receives the request from the client entity 10, controls the physical network or the virtual network, and provides the VTN service to the client entity 10. The server entity 14 is located on a data plane and provides the controller 12 with the physical network infrastructure or the virtual network infrastructure.

The controller 12 controls the physical or virtual network infrastructure provided by the server entity 14 and provides the VTN service to the client entity 10. The server entity 14 provides the physical or virtual network infrastructure. The server entity 14 may be defined as a network of, for example, network equipment, multi-vendors, multi-domains, and multi-operators. Upon request from the client entity 10 for protection switching on an arbitrary path within the VTN, the controller 12 sets up the protection switching service on the virtual or physical network infrastructure in real time in order to provide the real-time protection switching service.

In one embodiment, upon request from the client entity 10-1 for protection switching service with respect to VTN internal path AC, the controller 12 creates a protection switching group (PG) that includes both a working path (A",B",D",G") and a protection path (A",a, C",E",F",G"), each of which passes through two server entities 14-1 and 14-n. In the event of a failure occurring on the working path after configuring protection switching, the working path is promptly switched to the protection path, thereby minimizing the service disconnection time.

Figure 2:
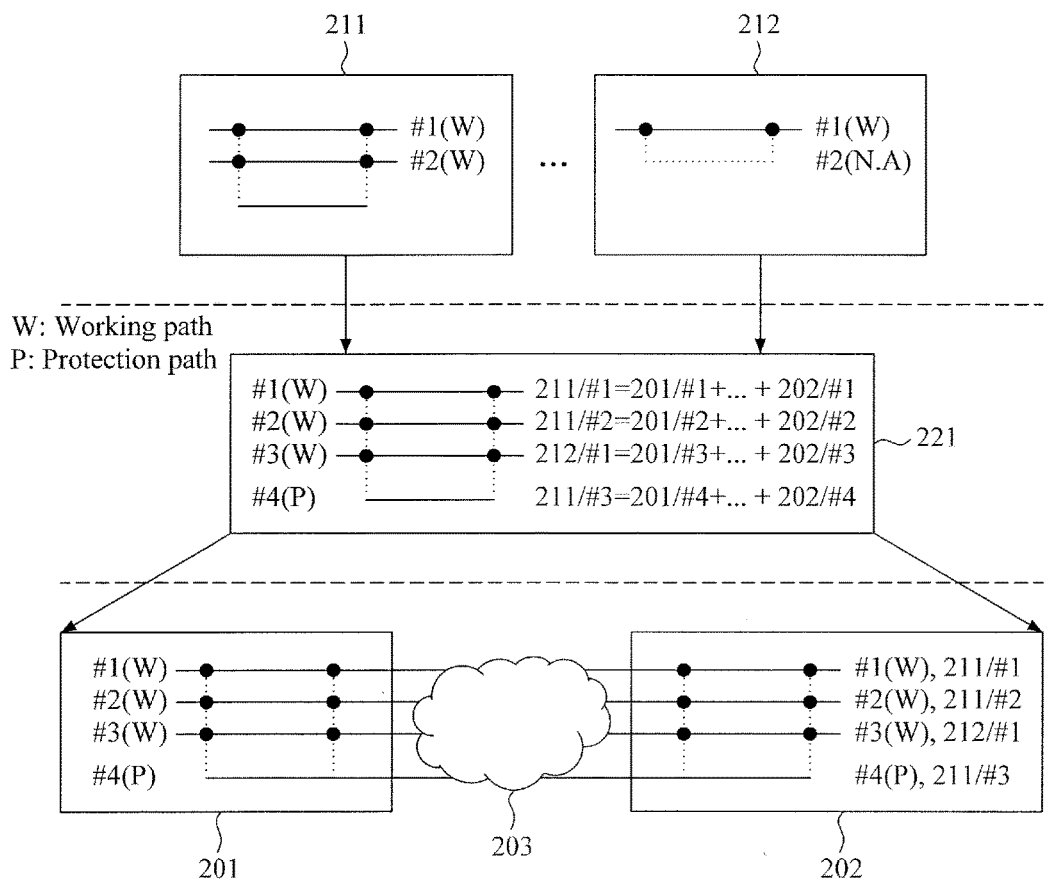
FIG. 2 is a conceptual diagram for explaining VTN protection switching in the case where a plurality of client entities share one protection switching group in 1:n manner.

FIG. 2 is a conceptual diagram for explaining VTN protection switching in the case where a plurality of client entities share one protection switching group in 1:n manner.

Referring to FIG. 2, it is assumed that the protection switching group consists of two working paths #1 and #2 and one protection path # which are all associated with client entity 1 211 and one working path #1 associated with client entity 2 212. Also it is assumed that the client entity 1 211 uses a protection path while the client entity 2 212 does not use a protection path but manages only state information. The controller 221 manages the protection switching group that consists of the protection paths and the working paths, sets up protection switching in the server entity for the protection path and the working path, and manages routing path information regarding paths that pass through the server entities. The routing path information indicates an actual path along which data is transmitted, among a number of VTN paths of each client entity. Working path #1 of the controller 221 corresponds to the working path #1 of the client entity 1 211, and also to working path #1 that passes through three server entities 201, 202, and 203.

The present disclosure discloses a technology for configuring protecting switching in order to provide a VTN protection switching service (1+1, 1:1, 1:n, etc.) to a plurality of client entities, satisfying the following requirements. For example, 1:1 VTN protection switching service is provided, which allows one client entity to exclusively use a protection switching group. In another example, 1:n VTN protection switching service is provided, which allows a plurality of client entities to share one protection switching group. In this case, if one of client entities requests to use the protection path, a service for ensuring exclusive use of the protection path may be provided to the requesting client entity.

There may be two modes available to deal with a failure occurring in the working path of the protection switching group: one is reactive protection mode in which the controller directly performs protection switching, and the other is proactive protection mode in which the server entity performs protection switching. In reactive protection mode, the controller defines a protection switching failure event in the server entity beforehand, and, in the occurrence of a failure, the controller receives an event report from the server entity and performs protection switching. In contrary, in the protective protection mode, the controller specifies protection switching trigger requirements in the server entity beforehand, and in the event of a failure, the server entity performs protection switching. is FIG. 3 is a diagram illustrating in detail a VTN protection switching system and a controller included in the system according to an exemplary embodiment of the present invention.

Figure 3:
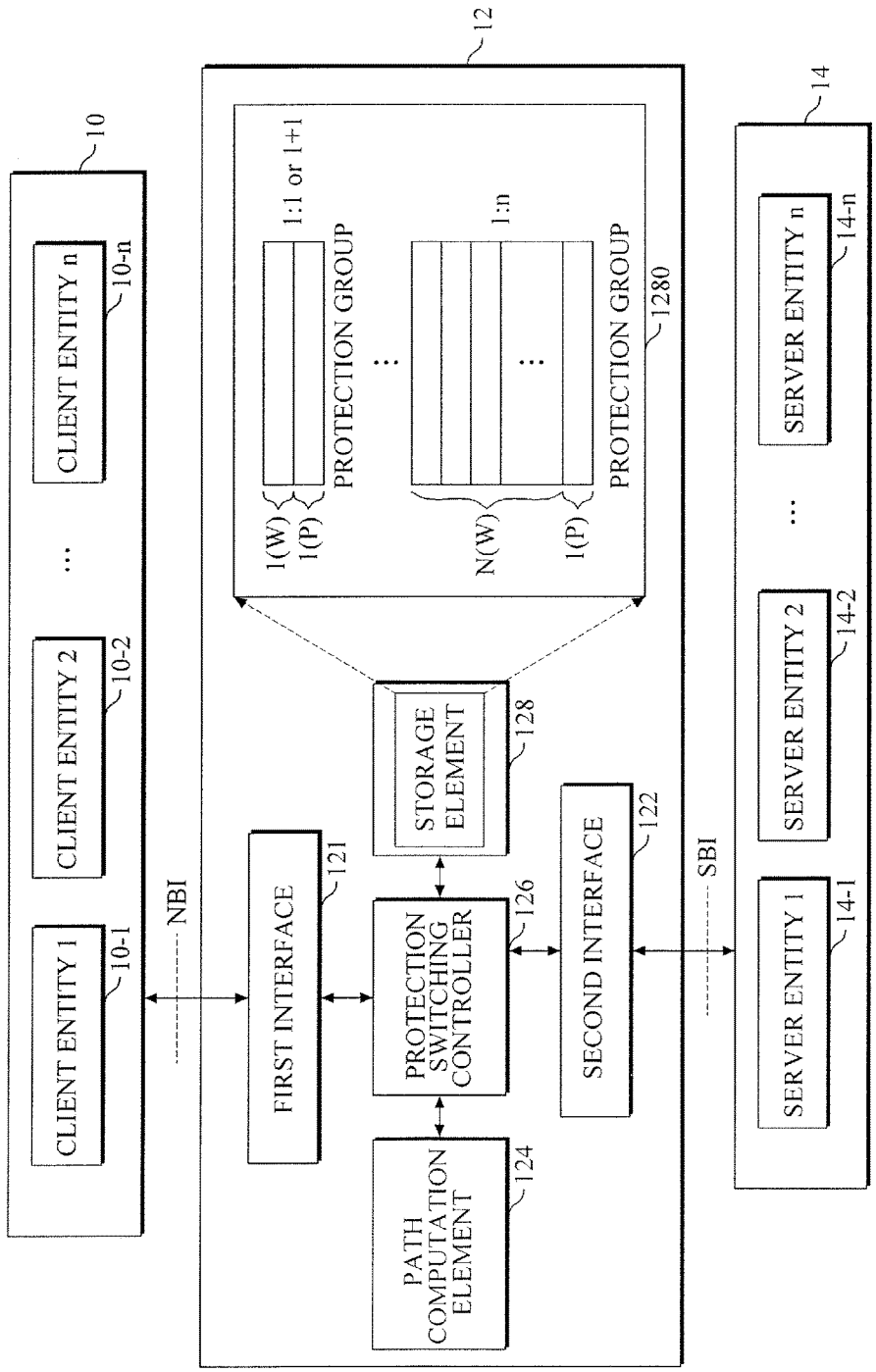
FIG. 3 is a diagram illustrating in detail a VTN protection switching system and a controller included in the system according to an exemplary embodiment of the present invention.

Referring to FIG. 3, the VTN protection switching system includes a client entity 10, a controller 12, and a server entity 14.

Upon request from the client entity 10 for a protection switching service, the controller 12 provides the protection switching service to the client entity 10. A plurality of client entities 10 may be provided. For example, there may be n number of client entities 10-1, 10-2, . . . , and 10-n, as illustrated in FIG. 3. The server entity 14 provides a network infrastructure (a working path and a protection path) for protection switching. A plurality of server entities 14 may be provided. For example, there may be n number of server entities 14-1, 14-2, . . . , and 14-n, as illustrated in FIG. 1.

In one embodiment, the controller 12 includes a first interface (north band interface: NBI), a second interface (south band interface: SBI) 122, a path computation element (PCE) 124, a protection switching controller (PSC) 126, and a storage element 128. The storage element stores a path information table 1280.

The first interface 121 provides an interface for connection with the client entity 10. The second interface 122 provides an interface for connection with the server entity 14. The path computation element 124 computes routing paths of a protection path and a working path. The protection switching controller 126 performs protection switching. The path information table 1280 provides path information for protection switching.

The path information table 1280 stores mapping information between working paths W and protection paths P of each protection switching group (e.g., 1+1, 1:1, and 1:n groups). The mapping information is used for a fast protection switching service to a protection path in the event of a failure occurring in a working path. In one example, the path information table 1280 stores VTN internal path information and information on each protection switching group. Is The VTN internal path information contains routing information of VTN internal path, and information on bandwidth and service level of the VTN internal path. The routing information of VTN internal path is represented as a group of server entities that the path passes through. The information on bandwidth and service level of VTN internal path indicates a bandwidth and a service level of the path.

The protection switching group information contains a type of protection switching (e.g., 1+1, 1:1, and 1:n), protection path routing information, working path routing information, bandwidth and service level of working path and protection path, head-end and tail-end information, and so on. The protection path routing information indicates a routing path of a protection path to a server entity along which data is actually transmitted, among virtual paths within the VTN for the protection switching service. The working path routing information indicates a routing path to a server entity to which actual data is transmitted along a working path among virtual paths inside the VTN for the protection switching service. The head-end and tail-end information is information about head-end and tail-end server entities on both of which working path monitoring and protection switching are performed, and specifically, about a server entity that bridges the working path and the protection path.

Identification information is used to set up and release protection switching among the controller, the client entity 10 and the server entity 14. The identification information includes protection path identification information, working path identification information, protection switching group identification information, and path identification information.

The protection path identification information is information used to specify or identify a protection path among the controller 12, the client entity 10, and the server entity 14 and is provided by the controller 12 to the client entity 10 and the server entity 14 at the time of setting up the protection path. The working path identification information is used to specify or identify a working path among the controller 12, the client entity 10, and the server entity 14 and is provided by the controller 12 to the client entity 10 and the server entity 14 at the time of setting up the working path. The protection switching group identification information is used to specify or identify a protection switching group for the controller 12, the client entity 10, and the server entity 14 and is provided by the controller 12 to the client entity 10 and the server entity 14 at the time of setting up the protection path. The path identification information is used to identify the VTN internal path among the controller 12, the client entity 10, and the server entity 14 and is provided by the controller 12 to the client entity 10 and the server entity 14 at the time of setting up a path.

Figure 4:
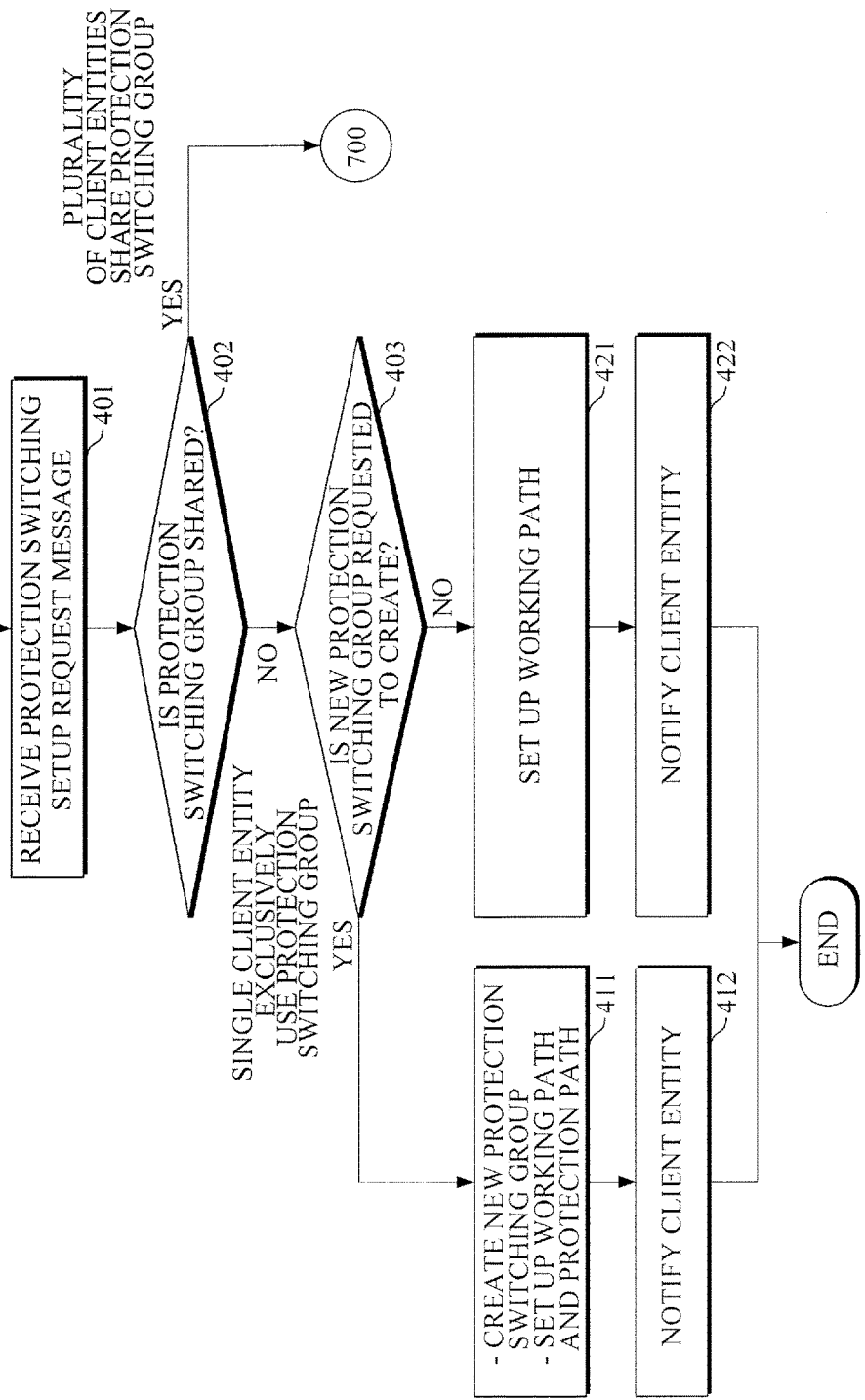
FIG. 4 is a flowchart illustrating a VTN protection switching setup process according to an exemplary embodiment of the present invention.

FIG. 4 is a flowchart illustrating a VTN protection switching setup process according to an exemplary embodiment of the present invention. Specifically, FIG. 4 is a flowchart illustrating a VTN protection switching setup process when a protection switching group is exclusively used by one client entity.

To provide a protection switching service to the client entity, a path for providing the VTN service is required to be set up first. Upon request from the client entity for setting up a VTN path, the controller sets a routing path in the server entity, and then sends the path identification information as well as a completion message to the client entity. After the completion of setup of the VTN path, the client entity requests a protection switching service to the controller, as well as sends path information through which to receive the VTN protection switching service, a type of protection switching, and protection switching setup selection information.

The protection switching setup selection information may indicate, for example, a protection switching group specified by the client entity. To this end, the client entity may request the controller to set up a working path in the existing protection switching group. To specify the protection switching group, the client entity may use a protection switching group identifier (ID). In another example, the client entity may not specify a protection switching group. For example, the client entity does not specify a protection switching group, but request the controller to allocate a protection switching group. In yet another example, the client entity may exclusively use a protection switching group. In this case, the single client entity owns all working paths and protection paths belonging to the protection switching group. In yet another example, the client entity may share the protection switching group with other client entities, which is referred to as 1:n protection switching, in which a plurality of client entities shares the single protection switching group. In this case, the working paths owned by the client entities belong to one protection switching group, and thereby all client entities can share the working paths. The client entities that share the protection switching group may choose whether to use a protection path.

Hereinafter, the VTN protection switching setup process in the case of exclusive use of a protection switching group by one client entity will be described with reference to FIG. 4.

Referring to FIGS. 3 and 4, the controller 12 receives a protection switching setting request message from a specific client entity through the first interface 121. At this time, the controller 12 may also receive the working path and protection switching setting selection information from the client entity. The first interface 121 of the controller 12 delivers the received protection switching setting request message to the protection switching controller 126.

When receiving the protection switching setting request message from the first interface 121, as depicted in 401, the protection switching controller 126 analyzes the received protection switching setting request message to check whether the sending client entity wishes to share the protection switching group with other client entities, as depicted in 402. If the client entity wishes to share the protection switching group with other client entities, the process proceeds to 700. Detailed process of operation 700 will be described later with reference to FIG. 7.

On the contrary, if the specific client entity wishes to exclusively use the protection switching group, the controller 12 decides whether to use the existing protection switching group intact or create a new protection switching group, as depicted in 403. A working path for the protection switching service must belong to a particular protection switching group, and the existing protection switching group may be used intact or a new protection switching group may be created. In one embodiment, the controller 12 determines whether or not the existing protection switching group is available to use based on the type of protection switching, the protection switching setup selection information, the path characteristic information (bandwidth and service level), and the like. If the client entity specifies a particular protection switching group using the protection switching setup selection information, the existing protection switching group is used. In addition, if the protection switching group that is capable of receiving the working path is present, the existing protection switching group is used. However, if there is no available protection switching group, a new protection switching group is created.

In the case of using the existing protection switching group intact, the controller 12 sets up protection switching by joining a working path to the existing protection switching group, as depicted in 421. A detailed process of operation 421 will be described below with reference to FIG. 6. Thereafter, the controller 12 notifies the client entity of the result of setting up protection switching, as depicted in 422. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.).

In the case of using a new protection switching group, the controller 12 creates a new protection switching group and registers a working path and a protection path in the path information table 1280, as depicted in 411. A detailed process of operation 411 will be described below with reference to FIG. 5. When the client entity exclusively uses the protection switching group, said client entity has ownership (right of use) of the protection path. Then, in 412, the controller 12 notifies the client entity of the result of setting up protection switching. The controller 12 also provides protection switching information, such as the working path ID, the protection path ID, the protection switching group ID, the type of protection switching (e.g., 1+1, 1:1, 1:n), the state information of protection switching group (whether to use protection switching, the number of working paths, etc.).

Figure 5:
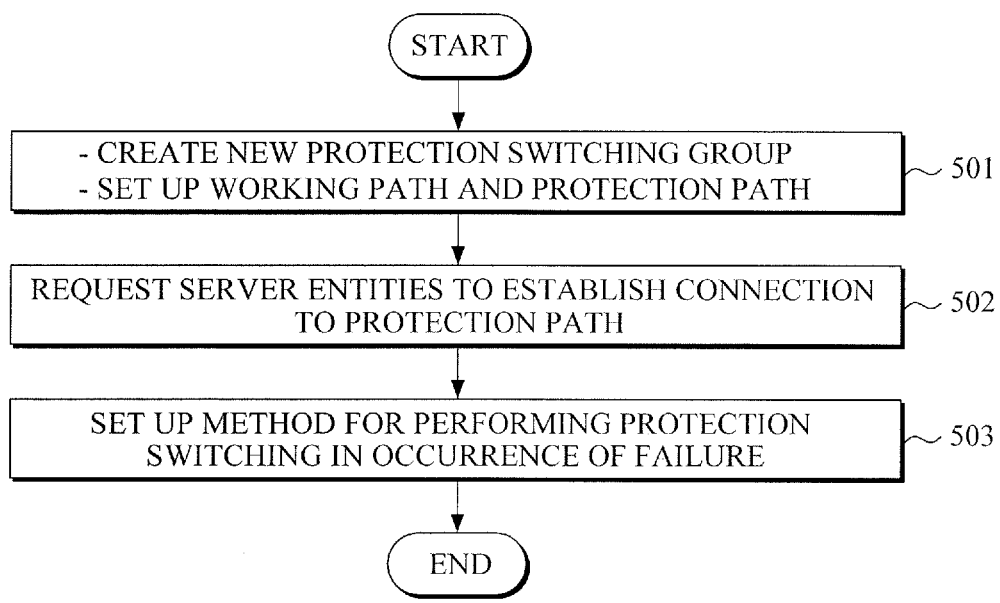
FIG. 5 is a flowchart illustrating a protection switching group setup process according to an exemplary embodiment of the present invention.

FIG. 5 is a flowchart illustrating a protection switching group setup process according to an exemplary embodiment of the present invention, and specifically, illustrating a protection switching group setup process in the case of creating a new protection switching group.

Referring to FIGS. 3 and 5, in 502, the controller 12 computes a routing path of a protection path that does not have an overlap with the working path and can satisfy requirement of the user, and the controller 12 uses the protection switching controller 126 to create a new protection switching group and register the working path and the protection path in the path information table 1280.

Then, in 502, the controller 12 requests the sever entity 14 through which the protection path passes to establish a connection to the protection path. At this time, the controller 12 provides protection switching identification information to the server entity 14, which contains the protection switching group ID and the protection path ID for mutual identification, so that the server entity 14 can use the protection switching identification information when notifying the controller 12 of the occurrence of protection switching.

Then, the controller 12 sets up a method for performing protection switching against a working path failure, as depicted in 503. At this time, a network administrator may select one from two methods, a reactive protection mode and a proactive protection mode.

In a reactive protection mode, when a failure occurs in a working path, the controller 12 requests the server entities 14 located at both ends (head end and tail end) of the working path to report a failure event. The controller 12 provides the server entity 14 with path identification information, which contains the protection switching group ID and the working path ID. In the event of the working path failure, the server entity 14 delivers the working path ID of the working path in which the failure has occurred, the protection switching group ID, and failure event information to the controller 12. The controller 12, which receives the failure event alarm, looks up a protection path in the path information table 1280 and switches from the working path to the protection path.

In a proactive protection mode, the controller 12 provides the server entities 14 located at both ends (head end and tail end) of the working path with protection switching identification information, which contains the protection switching group ID and the working path ID for protection switching. In addition, the controller 12 requests the server entity 14 to autonomously perform protection switching from the working path to the protection path in the event of a working path failure. Once the server entity 14 performs protection switching, the server entity 14 notifies the controller 12 of the performance of the protection switching. At this time, the server entity 14 also sends protection switching identification information that contains the protection switching group ID and the working path ID to the controller.

Figure 6:
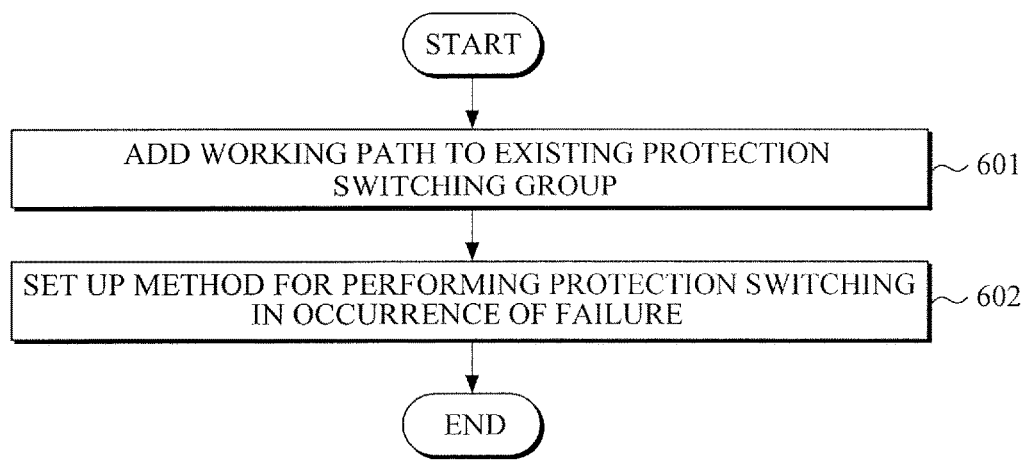
FIG. 6 is a flowchart illustrating a working path setup process according to an exemplary embodiment of the present invention.

FIG. 6 is a flowchart illustrating a working path setup process according to an exemplary embodiment of the present invention, and specifically, illustrating a working path setup process in the case of using the existing protection switching group.

Referring to FIGS. 3 and 6, the controller 12 joins the working path for protection switching service to the protection switching group in the path information table 1280, as depicted in 601. Then, the controller 12 sets up a method for performing protection switching against a working path failure, as depicted in 602. At this time, a network administrator may select one from two methods, a reactive protection mode and a proactive protection mode. Operation 602 is performed as the same way as in operation 503 described in FIG. 5, and thus detailed description thereof will be omitted.

Figure 7:
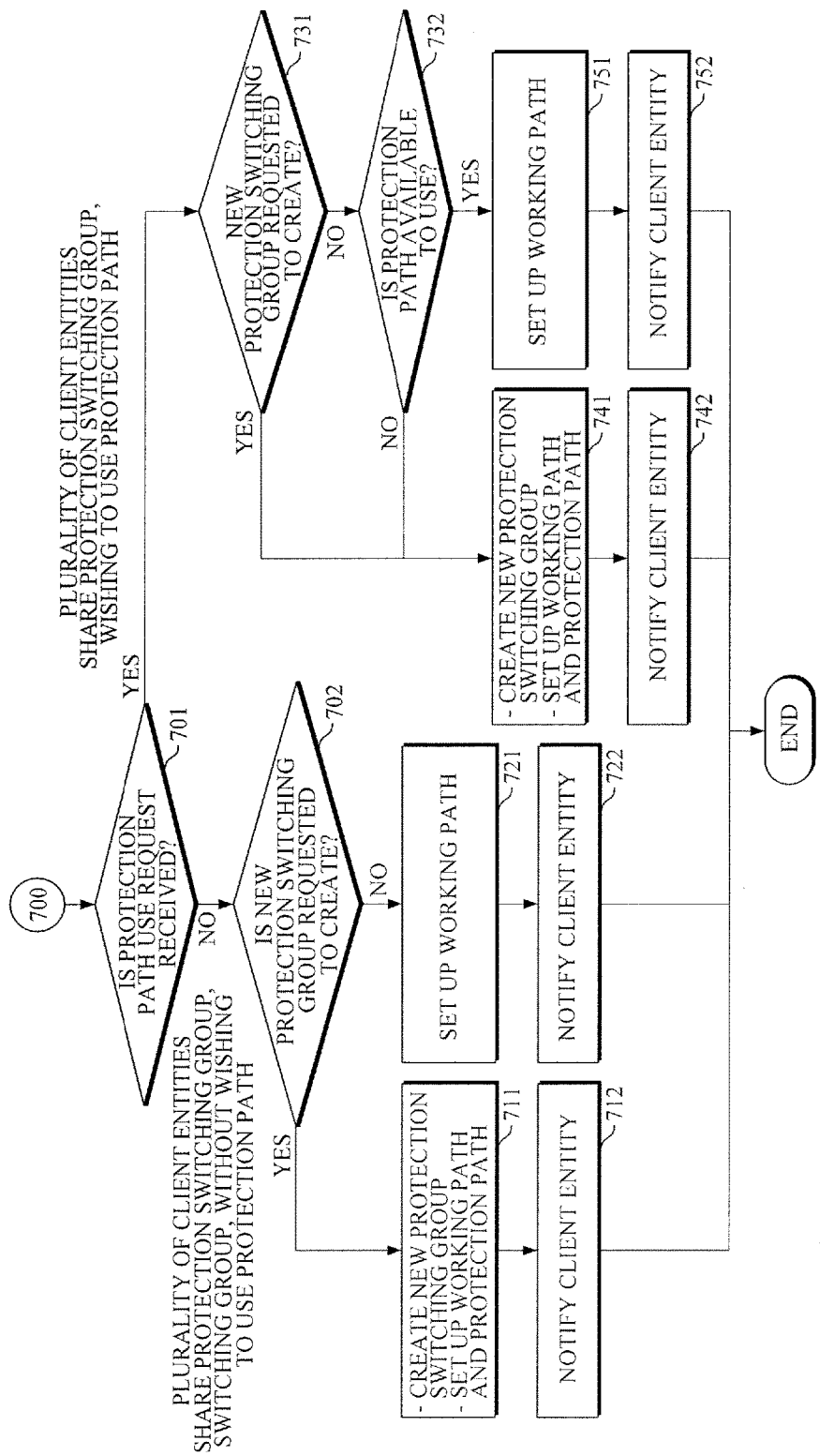
FIG. 7 is a flowchart illustrating a VTN protection switching setup process according to another exemplary embodiment of the present invention.

FIG. 7 is a flowchart illustrating a VTN protection switching setup process according to another exemplary embodiment of the present invention, and specifically, illustrating a VTN protection switching setup process in the case of a plurality of client entities sharing one protection switching group.

Referring to FIGS. 3 and 7, the controller 12 determines whether the plurality of client entities that are sharing one protection switching group request to use a protection path, as depicted in 701. If the plurality of client entities are sharing the same protection switching group, but do not wish to use a protection path, the controller 12 determines whether or not the existing protection switching group is available to be used for the working path that is requested for protection switching, as depicted in 702. In response to a determination that a new protection switching group is needed, the controller 12 creates a new protection switching group and sets up a working path and a protection path, as depicted in 711. Operation 711 may be carried out by performing operations 501, 502, and 503, which are described in FIG. 5. Thereafter, the controller 12 notifies the client entity of the result of setting up the protection switching, as depicted in 712. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.).

In response to a determination that the client entity uses the existing protection switching group without requesting for setup of a new protection switching group, the controller 12 sets up protection switching by joining a working path to the existing protection group, as depicted in 721. Operation 721 may be carried out by performing operations 601 and 602, which are described in FIG. 6. Then, the controller 12 notifies the client entity of the result of setting up the protection switching, as depicted in 722. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.).

In response to a determination in 701 that the multiple client entities sharing the single protection switching group wish to use the protection path, it is determined whether the existing protection group that has been previously set for the requested is available to be used for protection switching, as depicted in 731. If a new protection switching group needs to be created, for example, if the protection switching group is being used by another client entity and thus it is not possible to perform protection switching using said protection switching group, a new protection switching group is created, and a protection path and a working path are set up, as depicted in 741. Operation 741 may be carried out by performing operations 501, 502, and 503, which are described in FIG. 5. Then, in 742, the controller 12 notifies the client entity of the result of setting up the protection switching. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.). In addition, the controller 12 may notify the client entity of permission of use of protection path.

On the contrary, if the existing protection switching group is available to use, it is determined whether the protection path is available to use, as depicted in 732. In response to a determination that the existing protection switching group and the protection path are both available to use, the controller 12 sets up the protection switching by joining a working path to the existing protection switching group, as depicted in 751. Operation 751 may be carried out by performing operations 601 and 602, which are described in FIG. 6. Thereafter, in 752, the controller 12 notifies the client entity of the result of setting up the protection switching. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.). In addition, the controller 12 may notify the client entity of permission of use of protection path.

If the protection path is not available to use, a new protection switching group is created, and a protection path and a working path are set up, as depicted in 741. Operation 741 may be carried out by performing operations 501, 502, and 503, which are described in FIG. 5. Then, in 742, the controller notifies the client entity of the result of setting up the protection switching. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.). In addition, the controller 12 may notify the client entity of permission of use of protection path.

Figure 8:
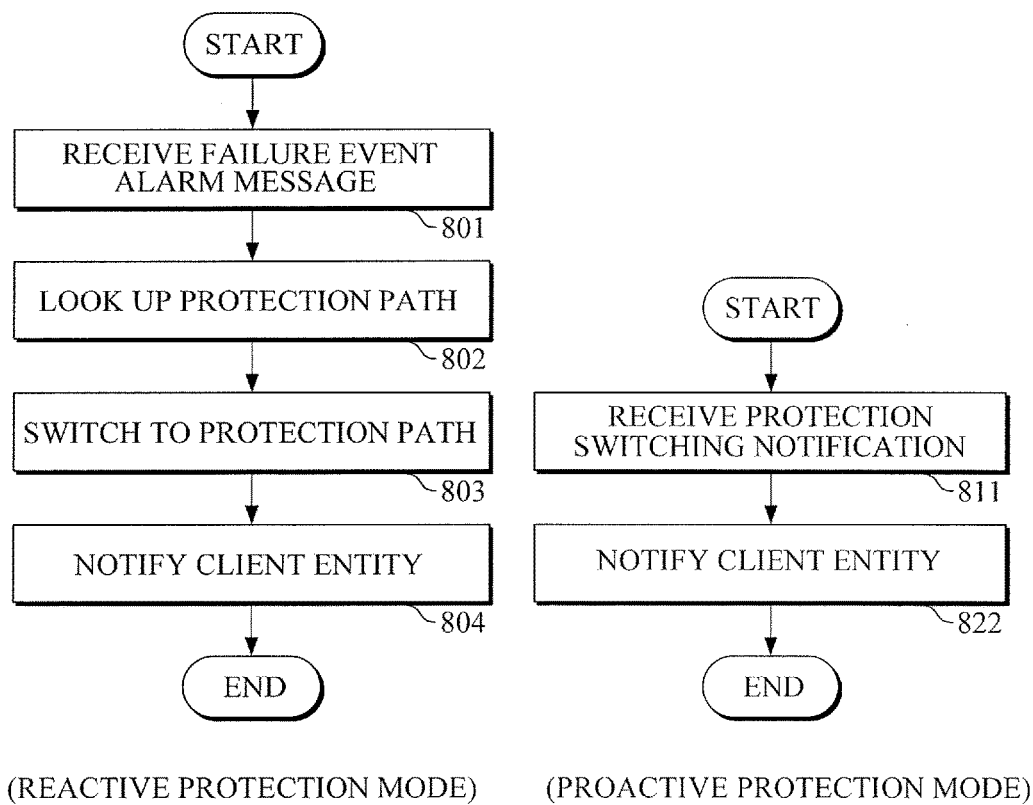
FIG. 8 is a flowchart illustrating a process for performing protection switching against a working path failure according to an exemplary embodiment of the present invention.

FIG. 8 is a flowchart illustrating a process for performing protection switching against a working path failure according to an exemplary embodiment of the present invention.

Referring to FIGS. 3 and 8, the controller 12 may perform protection switching in two modes, i.e., a reactive protection mode and a proactive protection mode.

In a reactive protection mode, the controller 12 receives a failure event alarm message for protection switching from the server entity 14, as depicted in 801. At this time, the controller 12 may also receive protection switching information regarding the working path in which the failure has occurred, including the protection switching group ID, the working path ID, and a type of failure event, as well. The controller 12 receives the failure event alarm message through the second interface 122 from the server entity 14 and delivers the received alarm message to the protection switching controller 126. Then, the protection switching controller 126 analyzes the received the failure event alarm message.

The protection switching controller 126 of the controller 12 looks up the routing information (head-end and tail-end server entity information) of the protection path that corresponds to the failure-occurring working path in the table information of each protection switching group by using the protection switching information, which is contained in the received message, as depicted in 802. Then, the protection switching controller 126 requests the head-end and tail-end server entities to switch from the working path to the protection path, as depicted in 803. Then, in 804, the controller 12 notifies the client entity 10 that the protection switching has been performed. At this time, the controller 12 may also provide protection switching information, such as the working path ID, the protection path ID, the protection switching group ID, the type of protection switching (e.g., 1+1, 1:1, 1:n), the state information of protection switching group (whether to use protection switching, the number of working paths, etc.).

In a proactive protection mode, the server entity 14 autonomously performs the protection switching without intervention of the controller 12 when a failure has occurred in a working path. In this case, the protection switching controller 126 of the controller 12 receives a notification from the server entity 14 through the second interface 122 that the protection switching has been performed, as depicted in 811. The received message notifying of protection switching may contain the protection switching group ID and the working path ID information. Then, the controller 12 notifies the client entity 10 that the protection switching has been performed, as depicted in 812. At this time, the controller 12 may also notify the protection switching information, such as the client entity 10 of the working path ID, the protection path ID, the protection switching group ID, the type of protection switching (e.g., 1+1, 1:1, 1:n), the state information of protection switching group (whether to use protection switching, the number of working paths, etc.).

Figure 9:
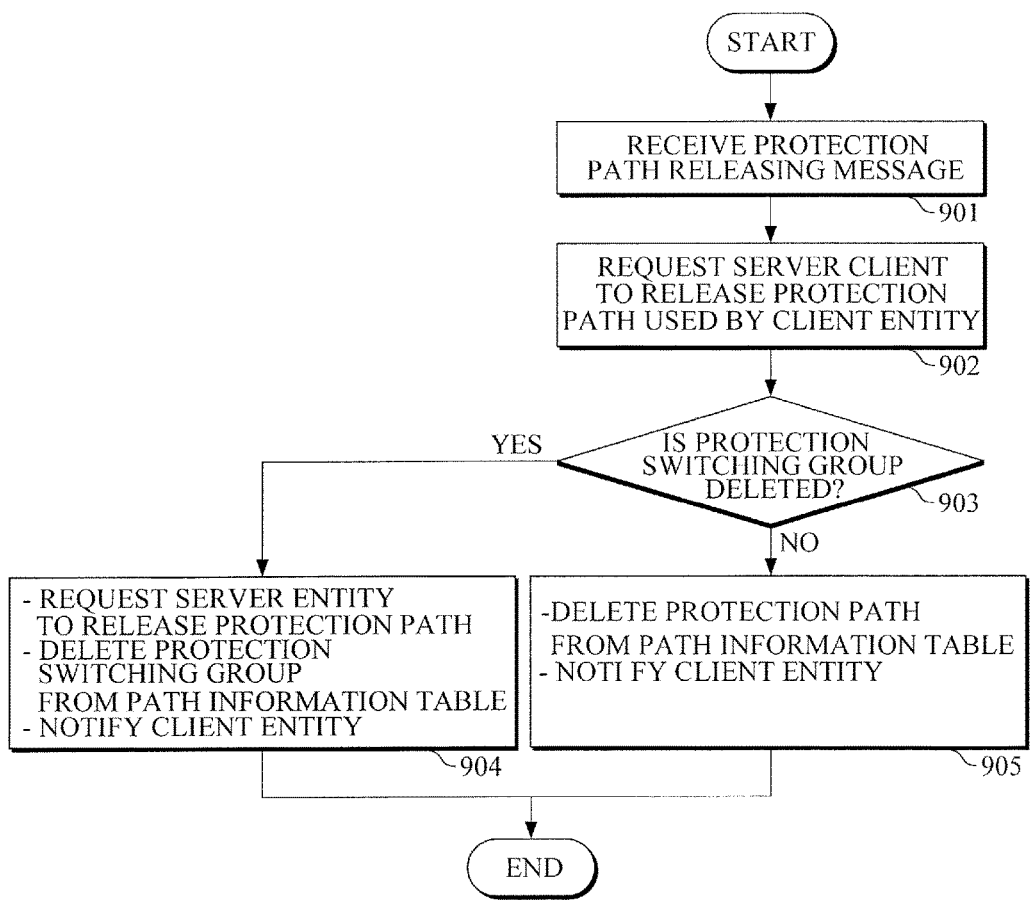
FIG. 9 is a flowchart illustrating a protection switching releasing process according to an exemplary embodiment of the present invention.

FIG. 9 is a flowchart illustrating a protection switching releasing process according to an exemplary embodiment of the present invention, and specifically, illustrating a protection switching releasing process for a protection path.

There are two types of protection switching release. First, the client entity 10 to provide the protection switching group ID and working path ID information to the controller 12 and request the controller 12 to release the protection switching. Second, the client entity 10 provides the protection switching group ID and the protection path ID information to the controller 12, so that the controller 12 can release only the protection path. The protection switching releasing process for the protection path will be described with reference to FIG. 9, and the protection switching releasing process for a working path will be described below with reference to FIG. 10.

Referring to FIGS. 3 and 9, the controller 12 receives a protection path releasing message from the client entity 10 through the first interface 121, the protection path releasing message containing the protection switching group ID and the protection path ID information, as depicted in 901. The received message is delivered to the protection switching controller 126 of the controller 12.

The protection switching controller 126 looks up the head-end and tail-end server entity information of the protection path in the path information table 1280 by using the protection switching group ID and the protection path ID information, which are contained in the received message. Then, the protection switching controller 126 requests the head-end and tail-end server entities to release the protection path used by the client entity 10, as depicted in 902.

Then, the protection switching controller 126 determines whether to delete the protection switching group, as depicted in 903. If the neither working path nor protection path is present in the protection switching group, the protection switching group can be deleted. To delete the protection switching group, the protection switching controller 126 instructs the server entity 14 that the protection path passes through to release the protection path, deletes the protection switching group that said protection path is belonging to from the path information table 1280, and notifies the client entity 10 of the result, as depicted in 904. On the contrary, if the protection switching group is maintained, the protection switching controller 126 deletes the protection path from the protection switching group in the path information table 1280 and notifies the client entity 10 of the result of deleting the working path, as depicted in 905.

Figure 10:
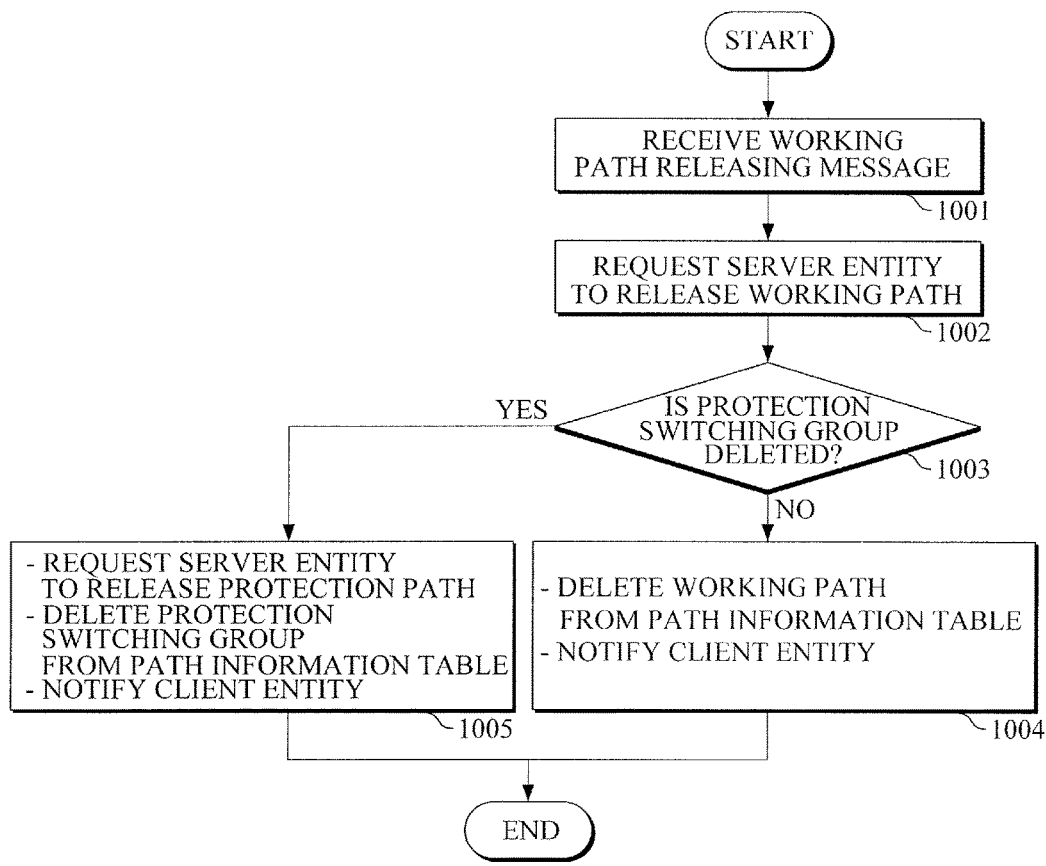
FIG. 10 is a flowchart illustrating a protection switching releasing process according to another exemplary embodiment of the present invention.

FIG. 10 is a flowchart illustrating a protection switching releasing process according to another exemplary embodiment of the present invention, and specifically, illustrating a protection switching releasing process for a working path.

Referring to FIGS. 3 and 10, the controller 12 receives a working path releasing message from the client entity 10, which contains information about a protection switching group ID and a working path ID, as depicted in 1001. The received message is delivered to the protection switching controller 126 of the controller 12.

The protection switching controller 126 looks up head-end and tail-end server entity information of the working path in the path information table 1280 by using the protection switching group ID and the working path ID, which are contained in the received working path releasing message. Then, the protection switching controller 126 requests the server entity 14 to release the working path, as depicted in 1002. The protection switching controller 126 may operate according to two types of protection switching setup modes: a reactive protection mode and a proactive protection mode. In a reactive protection mode, the protection switching controller 126 requests the server entity 14 to release an alarm event regarding the working path requested, and in a proactive protection mode, the protection switching controller 126 requests the sever entity 14 to clear protection switching settings.

Thereafter, in 1003, it is determined whether to delete the protection switching group. If neither working path nor protection path is present in the protection switching group, the protection switching group can be deleted. To delete the protection switching group, the protection switching controller 126 requests the server entity 14 that the protection path passes through to release the protection path, deletes the protection switching group that said protection path is belonging to from the path information table 1280, and notifies the client entity 10 of the result of releasing the protection switching, as depicted in 1005. On the contrary, if the protection switching group is maintained, the protection switching controller 126 deletes the working path from the path information table 1280 and notifies the client entity 10 of the result of deleting the working path, as depicted in 1004.

The client entity 10, the controller 12, and the server entity 14 synchronize state information of each protection switching group using the protection switching group ID, the protection path ID, the working path ID. That is, the client entity 10, the controller 12, and the server entity 14 synchronize the state information of each protection switching group by exchanging periodic update messages or frequently exchanging state messages in the event of a change in state of the protection switching group.

According to the exemplary embodiments as described above, it is possible to set up real-time protection switching on a VTN path so as to provide reliability of a VTN service.

In addition, the protection switching is set to be performed on a physical network infrastructure by utilizing a proactive protection mode. Therefore, it is possible to provide a protection switching service by using the existing standardized automatic protection switching (APS) protocol intact. Moreover, it is possible for the client entities to share a protection path group in order to provide a VTN protection switching service at lower cost.

The above exemplary embodiments of the present disclosure enable communication providers to strengthen their competitive advantage, as well as provide users with reliable real-time network services, and hence increase service quality, user satisfaction, and reduction in cost.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing a protection switching service, comprising:
    receiving a protection switching setup request message from a client entity that requests setup of protection switching in a virtual tenant network (VTN);
    analyzing the protection switching setup request message to determine a check result indicating whether or not the client entity requests to share a protection switching group with other client entities;
    in response to the check result indicating that the client entity does not request to share the protection switching group, setting up protection switching for the client entity alone to exclusively use the protection switching group; and
    in response to the check result indicating that the client entity requests to share the protection switching group, setting up protection switching for a plurality of client entities to share the protection switching group,
    wherein the setting up of the protection switching for the client entity alone to exclusively use the protection switching group comprises,
        in response to the check result indicating that the client entity does not request to share the protection switching group,
        performing a determination indicating whether an existing protection switching group is available to use or a new protection switching group needs to be used, setting up, in response to the determination that a new protection switching group needs to be used, the protection switching by creating the new protection switching group, and
        setting up, in response to the determination that the existing protection switching group is available to use intact, the protection switching by joining a working path to the existing protection switching group.

2. The method of claim 1, wherein in the receiving of the protection setup switching request message, path characteristic information, protection switching type information and protection switching setup selection information are also received from the client entity, and the protection switching setup selection information contains information indicating the following: whether to specify the protection switching group, whether to share the protection switching group, whether to exclusively use the protection switching group, and whether to use a protection path in an event of sharing the protection switching group.

3. The method of claim 1, wherein in the determining of whether the existing protection switching group is available to use comprises,
    determining whether the existing protection switching group is available to use based on path characteristic information, the protection switching type information, and the protection switching setup selection information, which are received from the client entity,
    determining to use the existing protection switching group when the client entity specifies a protection switching group or when the protection switching group capable of receiving the working path is present, and
    creating the new protection switching group when there is no available protection switching group.

4. The method of claim 1, wherein the setting up of the protection switching by creating the new protection switching group comprises
    creating the new protection switching group and registering the working path and a protection path belonging to the created protection switching group,
    requesting a server entity that the protection path passes through to establish a connection to the protection path, and setting up a method for performing protection switching against a working path failure.

5. The method of claim 4, wherein in the setting up of the method for performing protection switching, the server entity is set to report a working path failure event to a controller in a reactive protection mode, in order to enable the controller to perform protection switching.

6. The method of claim 4, wherein in the setting up of the method for performing protection switching, the server entity is set to switch from the working path to the protection path autonomously in order to perform protection switching in a failure in a proactive protection mode.

7. The method of claim 1, wherein the setting up of the protection switching by joining the working path to the existing protection switching group comprises
    joining the working path to the existing protection switching group,
    setting the server entity to report a failure event to a controller in a reactive protection mode, in order to enable the controller to perform protection switching, and
    setting the server entity to switch from the working path to a protection path autonomously in order to perform protection switching in the occurrence of a failure in a proactive protection mode.

8. The method of claim 1, further comprising performing protection switching based on an occurrence of a failure in a working path.

9. The method of claim 8, wherein the performing of the protection switching comprises,
    in the occurrence of the failure in the working path, receiving a failure event alarm message from the server entity in a reactive protection mode,
    looking up routing information of a protection path that corresponds to the working path in which the failure occurs in a path information table by using protection switching information in the received failure event alarm message,
    switching from the working path to the protection path using the routing information of the protection path, and notifying the client entity that the protection switching has been performed.

10. The method of claim 8, wherein the performing of the protection switching comprises,
in a proactive protection mode, receiving a notification that the server entity performs the protection switching without intervention of a controller when a failure has occurred in the working path, and
notifying the client entity that the protection switching has been performed.

11. The method of claim 1, further comprising:
receiving a protection path releasing message from the client entity;
requesting the server client to release the protection path used by the client entity;
determining whether to delete the protection switching group or to maintain the protection switching group;
in response to determining that the protection switching group is to be deleted, requesting the server entity through which the protection path passes to release the protection path, deleting the protection switching group containing the protection path from the path information table, and notifying the client entity of a result of releasing the protection switching; and
in response to determining that the protection switching group is maintained, deleting the protection path from the protection switching group in the path information table and notifying the client entity of a result of deleting the protection path.

12. The method of claim 1, further comprising:
receiving a working path releasing message from the client entity;
requesting the server entity to release the working path that was used by the client entity;
determining whether to delete the protection switching group or to maintain the protection switching group;
in response to determining that the protection switching group is to be deleted, requesting the server entity through which the protection path passes to release the protection path, deleting the protection switching group containing the protection path from the path information table, and notifying the client entity of a result of releasing the protection switching; and
in response to determining that the protection switching group is maintained, deleting the working path from the protection switching group in the path information table and notifying the client entity of a result of deleting the working path.

13. The method of claim 12, wherein the requesting to release the working path comprises,
in a reactive protection mode, requesting the server entity to release an alarm event regarding the working path requested, and
in a proactive protection mode, requesting the server entity to clear protection switching settings.

14. A method for providing a protection switching service, comprising:
receiving a protection switching setup request message from a client entity that requests setup of protection switching in a virtual, tenant network (VTN);
analyzing the protection switching setup request message to determine a check result indicating whether or not the client entity requests to share a protection switching group with other client entities;
in response to the check result indicating that the client entity does not request to share the protection switching group, setting up protection switching for the client entity one to exclusive use the protection switching group; and
in response to the check result indicating that the client entity requests to share the protection switching group, setting up protection; switching for a plurality of client entities to share the protection switching group,
wherein the setting up of the protection switching for the plurality of client entities to share the protection switching group comprises
performing a determination to check whether or not the plurality of client entities that share the protection switching group request to use a protection path,
in response to the determination that the plurality of client entities do not request to use the protection path, determining whether the existing protection switching group is available to use, creating the new protection switching group and setting up a working path and the protection path in response to determining that the new protection switching group needs to be used, and joining the working path to the existing protection group in response to determining that the existing protection switching group is available to use, and
in response to the determination that the plurality of client entities request to use the protection path, determining whether the existing protection switching group is available to use, creating the new protection switching group and setting up a working path and a protection path in response to the determination that the new protection switching group needs to be used, and joining the working path to the existing protection group in response to the determination that the existing protection switching group is available to use.

15. The method of claim 14, wherein the setting up of the protection switching for the plurality of client entities to share the protection switching group comprises
once the setup of the protection switching is completed, notifying the client entity of a result of setup of the protection switching, and
notifying the client entity of protection switching information, as well, which includes a working path identifier, a protection path identifier, a protection switching group identifier, a type of protection switching and state information of the protection switching group.

16. A virtual tenant network controller comprising:
a first interface configured to be connected to a client entity which requests a protection switching service in a virtual tenant network (VTN) or requests to release a protection path;
a second interface configured to be connected to a server entity that provides a network infrastructure or releases the protection path used by the client entity;
a path computation element configured to compute routing paths of a working path and the protection path;
a protection switching controller configured to manage a protection switching group consisting of the working path and the protection path, set up protection switching according to a request from the client entity, perform protection switching, and perform a determination indicating whether to delete the protection switching group when receiving the request to release the protection path; and
a storage element configured to store path information for the protection switching in a path information table, and based on the determination of the protection switching controller whether to delete the protection switching group, delete from the path information table the protection switching group containing the protection path or delete from the path information table the protection path in the protection switching group.

17. The virtual tenant network controller of claim 16, being configured to provide the client entity with the protection switching service associated with the VTN in a software-defined network (SDN).

18. The virtual tenant network controller of claim 13, wherein the path information table stores mapping information between the working path and the protection path of the protection switching group.

19. The virtual tenant network controller of claim 17, wherein the protection switching controller is configured to set up the protection switching to be performed on a physical network infrastructure, and thereby is allowed to use standardized protection switching protocol without modifying the standardized protection switching protocol.

* * * * *